Jan. 11, 1949.    J. YOUNG, JR    2,458,670
TUBE SUPPORT
Filed Sept. 10, 1945
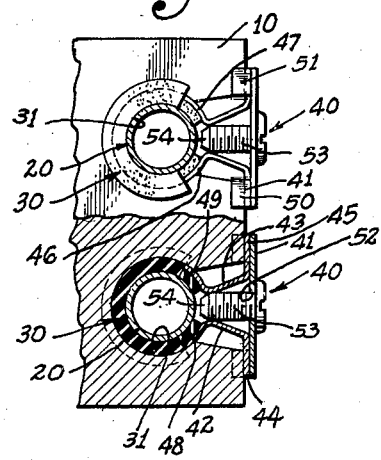
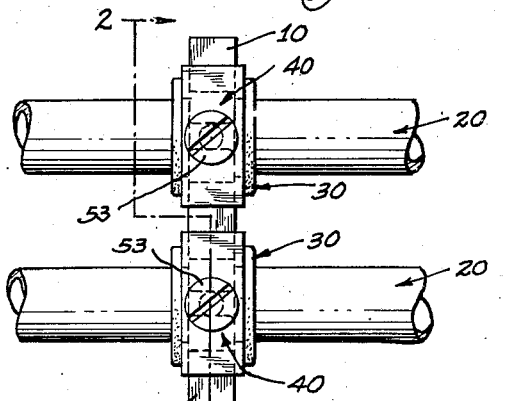
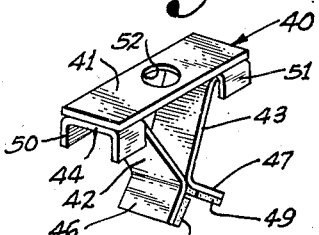
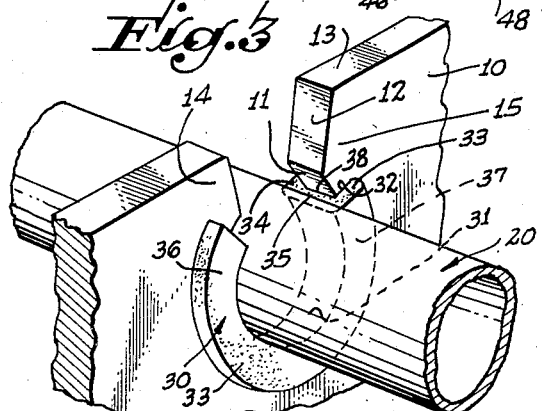
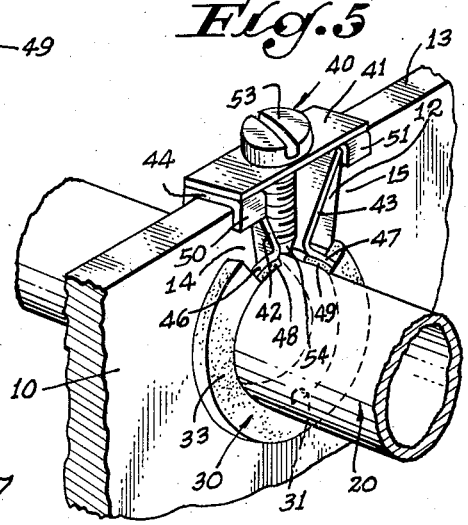
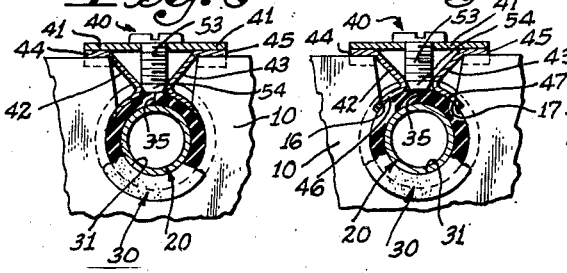
INVENTOR
JOHN YOUNG, JR.
BY
HARRIS, KIECH, FOSTER & HARRIS
FOR THE FIRM
ATTORNEYS Patented Jan. 11, 1949

2,458,670

UNITED STATES PATENT OFFICE 2,458,670

TUBE SUPPORT

John Young, Jr., Southgate, Calif., assignor to Hughes Tool Company, Houston, Tex., a corporation of Delaware Application September 10, 1945, Serial No. 615,449

14 Claims. (Cl. 248—56)

My invention relates to a means for sustaining elongated members and more specifically to devices of this general character which are particularly adapted for permitting facile and rapid installation and/or removal of the members.

Many installations employing elongated members, such as wires, rods, tubes, pipes, etc., require the utilization of a means for sustaining the members in a positive and reliable manner while permitting independent attachment or detachment thereof with a minimum expenditure of time. The time consideration is especially important when removal of any one member or any combination thereof is necessary at relatively frequent intervals, or when large numbers of similar wires or tubes are to be secured to a supporting structure in an efficient and rapid manner.

The hydraulic system of the modern airplane provides a graphic illustration of these considerations, since the design thereof necessitates the installation of large number of hydraulic tubes or lines to convey fluid to the various hydraulically-operated components thereof. Because of the limited space available for the installation of the large number of tubes involved, the sustaining means must be compact and is preferably adapted for rapid and facile application to reduce the installation time required. The tube supports should be of a permanent and reliable nature while permitting individual attachment or removal of any one tube to effect repairs, or for other purposes without disturbing the remaining lines. The most efficient mode of installation involves routing parallel tubes through the airplane with a minimum spacing therebetween and providing a means of support at appropriate intervals. The conventional sustaining means comprises a pair of mutually complementary clamping blocks, one disposed on either side of the group of tubes and interconnected by means of bolts, one of the blocks being attached to the structure of the airplane to support the group of tubes. The principal disadvantages of this manner of attachment are the necessity for mounting all of the tubes simultaneously and the fact that all tubes must be released to permit removal of any one tube. These factors considerably increase the time required to effect any operations relating to the installation or removal of the tubes and unnecessarily complicate such operations.

A primary objective of my invention, therefore, is the provision of a means for sustaining elongated members which is adapted for rapid installation without sacrificing permanence and dependability.

Another object of my invention is to provide a supporting means which is compact and may be employed for individual attachment or detachment of closely-spaced adjacent members.

A further object of my invention is the provision of a supporting means adapted for effecting a positive locking action which will be unaffected by vibrational or other stresses.

An additional purpose of my invention is the provision of a spacing or insulating means for preventing direct contact between the elongated member and the supporting structure.

An important feature of my invention is to provide a simple and lightweight means for sustaining elongated members which may be fabricated and assembled inexpensively.

I prefer to effect a realization of these and other objectives of my invention by means of the embodiments shown in the accompanying drawing, which is for illustrative purposes only, wherein:

Fig. 1 is a plan view representing an application of my invention to a pair of parallel tubular members;

Fig. 2 is a sectional view taken along the line 2—2 of Fig. 1;

Fig. 3 is a perspective view illustrating one embodiment of my invention in partially assembled form;

Fig. 4 is a perspective view showing a spring clip which forms one component of the invention;

Fig. 5 is a view similar to Fig. 3 illustrating the completely assembled form thereof;

Fig. 6 is a sectional view indicating another embodiment thereof; and

Fig. 7 is a view similar to Fig. 6 illustrating still another embodiment of the invention.

Referring to the drawing, the sustaining means includes a mounting element 10 adapted for embracing a tubular member 20 which is separated therefrom by a spacing means 30 and secured thereto by a resilient locking means 40. The mounting element 10 is preferably formed of a relatively thin plate of any suitable material and may be secured to a supporting structure (not shown) by any appropriate means as is well known in the art. The mounting element 10 is provided with an opening 11 therethrough which is larger than and adapted to receive the tube 20 therein. The shape of the opening 11 is preferably complementary to the peripheral configuration of the tube 20, a circular tube having been selected for the purpose of illustrating the invention. The mounting element 10 is provided with a slot 12 extending inwardly from an edge 13 thereof to communicate with the opening 11, the width of the slot 12 being sufficient to permit lateral insertion of the tube 20 therethrough into the opening 11 and to define a pair of inwardly-extending segments 14 and 15 adjacent the sides thereof between the peripheral wall of the opening 11 and the edge 13.

The spacing means 30 is preferably an annular grommet formed of rubber, neoprene or the like to separate the mounting element 10 and the tube 20 and serves to protect the tube 20 against any damage resulting from direct contact. The spacing means 30 further tends to dampen any vibration of the mounting element 10 which may be transmitted to the tube 20 in mechanical applications of the invention, or the invention may also be applied to electrical installations by forming the spacing means 30 of any appropriate insulating material. As best shown in Fig. 3, the grommet 30 is formed with a hole 31 therethrough and an annular groove 32 in the outer periphery thereof, the groove 32 defining a pair of spaced flanges 33 and 34. The spacing means 30 is also preferably provided with a relatively wide radial slit 35 therein to permit insertion of the locking means 40 between the ends 36 and 37 thereof as will be described in detail hereinafter. The diameter of the base 38 of the groove 32 is preferably sufficient to provide a snug fit between the base 38 and the peripheral wall of the opening 11, and the diameter of the flanges 33 and 34 should be sufficient to provide an area of engagement with the mounting element 10 sufficient to prevent axial movement of the grommet 30 relative to the mounting element 10. An adequate flange diameter may best be achieved by providing for peripheral insertion (insertion parallel to the periphery of the opening 11) of the spacing means 30 during assembly of the device, since axial insertion (insertion parallel to the longitudinal axis of the tube 20) would necessitate a small flange diameter to permit forcing one flange 33 or 34 through the space between the tube 20 and the peripheral wall of the opening 11.

Referring particularly to Figs. 2 and 4, the locking means or spring clip 40 is preferably formed of a suitable spring metal and includes a base member 41, which may be flexible or substantially rigid, and to which are secured a pair of spaced, laterally-extending, flexible arms 42 and 43, the attachment preferably being effected by welding to the base member 41 intermediate the ends thereof flanges 44 and 45 formed on the arms 42 and 43, respectively. The free ends of the arms 42 and 43 are preferably flared outwardly to form flanges 46 and 47 which may be lined with pads 48 and 49 of any suitable material consistent with the employment of the device. The flanges 44 and 45 are the bases of channel sections 50 and 51 which are disposed adjacent the ends of the base member 41, as illustrated. The base member 41 is provided with an internally tapped hole 52 therethrough which is adapted for threaded reception of an externally-threaded screw 53, the latter being provided with a tapered point 54, as illustrated.

When assembling the device, the arms 42 and 43 can be urged together, as suggested in Fig. 4, by flexure of the arms or the base member 41. The device is then inserted into the slot 12 until the flanges 46 and 47 slip under the inwardly-extending segments 14 and 15 of the mounting element 10 and engage the peripheral wall of the opening 11 and the pads 48 and 49 engage the surface of the tube 20. Axial displacement of the spring clip 40 is prevented by the locking engagement of the channel sections 50 and 51 with the edge 13 of the mounting element 10 and release of the initial deformation applied to the arms 42 and 43 for the purpose of insertion into the slot 12 will tend to lock the spring clip 40 securely. I prefer, however, to provide the additional locking action offered by the screw 53 which will insure positive engagement by virtue of the spreading of the arms 42 and 43 by the tapered point 54 of the screw 53 as the latter is threadedly inserted into the hole 52 in the base member 41. As the arms 42 and 43 expand, the flanges 46 and 47 engage the ends 36 and 37 of the grommet 30 and effect peripheral compression thereof whereby radial expansion thereof occurs to provide a pressural contact with the mounting element 10 and tube 20.

The embodiments of my invention illustrated in Figs. 6 and 7 provide a spacing means 30 which engages the entire periphery of the tube 20 and the pads 48 and 49 may be eliminated. The flanges 46 and 47 are slidably disposed between the base 38 of the groove 32 in the grommet 30 and the peripheral wall of the opening 11 and expansion of the arms 42 and 43 may be effected as previously discussed. If desired, recesses 16 and 17 may be provided in the mounting element 10 to accommodate the flanges 46 and 47, as shown in Fig. 7, to facilitate expansion of the arms 42 and 43.

My invention thus provides a simple means for retaining the tube 20 within the opening 11 and insures a positive and dependable assembly. The spring clip 40 may be installed or removed readily and will not be dislodged by vibration of the mounting element 10, the expanding action offered by the tapered screw 53 providing a reliable locking action. The assembly is extremely light and compact and may be employed for sustaining very closely-spaced, adjacent rod-like members while permitting sufficient accessibility to effect individual attachment or detachment of the members, the simplicity of the various components making for facile and inexpensive fabrication thereof.

Although I have herein described various specific embodiments of my invention and have suggested several applications thereof for the purpose of clarifying the disclosure, the underlying inventive concept is capable of a more general interpretation and I do not intend, therefore, to be limited to the specific disclosures contained herein, but reserve the right to the protection offered by the full scope of my appended claims.

I claim as my invention:

1. In a device for supporting an elongated member, the combination of: a mounting element provided with an opening therethrough having rigidly defined walls for the reception of the elongated member; spacing means disposed in said opening between said elongated member and said mounting element; a resilient means extending into said opening; and means associated with said resilient means for effecting deformation thereof to force said spacing means into pressural contact with said mounting element and said elongated member to retain said elongated member in said opening.

2. In a device for supporting an elongated member, the combination of: a mounting element provided with an opening therethrough and a slot extending inwardly from an edge thereof to communicate with said opening, said slot and said opening having rigidly defined walls and being so dimensioned that the elongated member may pass through said slot into said opening; and locking means extending through said slot into said opening for retaining said elongated member therein.

3. In a device for supporting an elongated member, the combination of: a mounting element provided with an opening therethrough and a slot extending inwardly from an edge thereof to communicate with said opening, said slot and said opening being so dimensioned that the elongated member may pass through said slot into said opening; locking means extending through said slot into said opening; and means associated with said locking means and adapted for expanding said locking means into locked relationship with the wall of said opening.

4. In a device for supporting an elongated member, the combination of: a mounting element provided with an opening therethrough and a slot extending inwardly from an edge thereof to communicate with said opening, said slot and said opening being so dimensioned that the elongated member may pass through said slot into said opening; spacing means disposed in said opening between said elongated member and said mounting element; locking means extending through said slot into said opening; and means associated with said locking means and adapted for expanding said locking means into locked relationship with the wall of said opening.

5. In a device for supporting an elongated member, the combination of: a mounting element provided with an opening therethrough and a slot extending inwardly from an edge thereof to communicate with said opening, said slot and said opening being so dimensioned that the elongated member may pass through said slot into said opening; and locking means extending through said slot into said opening, said locking means being provided with a base member spanning the outer end of said slot and having a pair of spaced arms extending therefrom through said slot and into said opening to engaged said mounting element and said elongated member.

6. As an article of manufacture, a spring clip comprising: a flexible base member; a pair of spaced flexible arms secured to said base member intermediate the ends thereof and extending laterally therefrom; and a pair of channel sections secured to said base member adjacent the ends thereof.

7. As an article of manufacture, a spring clip comprising: a flexible base member; a pair of spaced flexible arms secured to said base member intermediate the ends thereof and extending laterally therefrom; a tapered pin inserted between said arms to regulate the spacing therebetween; and a pair of channel sections secured to said base member adjacent the ends thereof.

8. A device for supporting an elongated member, which includes: a relatively thin mounting element generally perpendicular to the axis of said member, having an opening therethrough for the reception of said member; laterally-insertable resilient means extending into said opening to engage the opposite sides of said element and retain said elongated member therein; and positively operated expanding means to hold said resilient means and said member within said element.

9. A device for supporting an elongated member, which includes: a relatively thin mounting element generally perpendicular to the axis of said member, having an opening therethrough for the reception of said member; spacing means held in said opening by engagement with the opposite faces of said element and retaining said elongated member therein; and a clip engaging said member and comprising expansible arms to retain said member within said opening, and adjustable means to force said arms outwardly.

10. A device for supporting an elongated member, which includes: a generally flat mounting element whose plane is substantially perpendicular to the axis of said member, said element having an opening therethrough for the reception of said member; spacing means held in said opening by engagement with the opposite faces of said element, and retaining said elongated member therein; and a clip having laterally extending arms adapted to bear against said member to retain the latter within said opening, and a wedging member movable to expand said arms to hold them within said opening, said clip being held to said mounting element.

11. A device for supporting an elongated member which includes: a relatively thin mounting element generally perpendicular to the axis of said member, having an opening therethrough and a slot extending from an edge thereof to communicate with said opening, said slot and said opening being so dimensioned that said member may pass through said slot into said opening; and locking means engaging said mounting element, extending through said slot to bear against said member, and having a pair of arms adapted to be expanded to bear against the sides of said opening and said member to hold the latter within said opening, and a wedging member operable to force said arms apart, whereby said member is held within said opening.

12. A device for supporting an elongated member which includes: a relatively thin mounting element having an opening therethrough and a slot extending from an edge thereof to communicate with said opening, the narrowest portion of said slot being wide enough to receive said member, and the widest portion of said opening being greater than the narrowest portion of said slot; and locking means extending through said slot into said opening to bear against the walls of the latter and retain said member in said opening.

13. A device for supporting an elongated member which includes: a relatively thin mounting element having an opening therethrough and a slot extending from an edge thereof to communicate with said opening, the narrowest portion of said slot being wide enough to receive said member, and the widest portion of said opening being greater than the narrowest portion of said slot; and a clip having lateral arms extending through said slot into said opening, and a wedging member operable to expand said arms to bear against the walls of said opening and retain said elongated member therein.

14. A device for supporting an elongated member which includes: a relatively thin mounting element having an opening therethrough and a slot extending from an edge thereof to communicate with said opening, the narrowest portion of said slot being wide enough to receive said member, and the widest portion of said opening being greater than the narrowest portion of said slot; a resilient member insertable through said slot to surround said elongated member and space it from said supporting member; and a clip having lateral arms extending through said slot into said opening, and a wedging member operable to expand said arms to bear against the walls of said opening and retain said elongated member therein.

JOHN YOUNG, JR.

REFERENCES CITED

The following references are of record in the file of this patent:

UNITED STATES PATENTS

| Number | Name | Date |
|---|---|---|
| 2,108,347 | Quarnstrom | Feb. 15, 1938 |
| 2,208,779 | Tinnerman | July 23, 1940 |
| 2,227,528 | Adler | Jan. 7, 1941 |
| 2,267,379 | Tinnerman | Dec. 23, 1941 |
| 2,291,148 | Carson | July 28, 1942 |
| 2,291,430 | Ingersoll | July 28, 1942 |
| 2,365,985 | West | Dec. 26, 1944 |